United States Patent Office 3,734,962
Patented May 22, 1973

3,734,962
PROCESS FOR THE PREPARATION OF HYDROXY-ALKYL-PERFLUOROALKANE SULFONAMIDES
Hans Niederprüm, Monheim, Rhineland, and Peter Voss, Leverkusen, Germany, assignors to Farbenfabriken Bayer Aktiengesellschaft, Leverkusen, Germany
No Drawing. Filed May 13, 1971, Ser. No. 143,238
Claims priority, application Germany, May 22, 1970, P 20 24 909.6
Int. Cl. C07c *143/74*
U.S. Cl. 260—556 F         3 Claims

ABSTRACT OF THE DISCLOSURE

Preparation of N-hydroxyalkyl perfluoroalkane sulfonamides by reacting the corresponding N-unsubstituted sulfonamides with a cyclic carbonate or sulfite at a temperature of about 50 to 250° C. in the presence of an inorganic or organic base.

---

This invention relates to a process for the preparation of hydroxyalkyl-perfluoroalkane sulfonamides of the general formula:

$$R_F SO_2-N(R)-R'-OH$$

in which $R_F$ represents a straight or branched chain perfluoroalkyl radical having about 1 to 12 carbon atoms;
R represents hydrogen; an alkyl, alkenyl, aralkyl, cycloalkyl or aryl radical which has about 1 to 20 carbon atoms and which may optionally be substituted with inert substituents; or the group R'—OH; and
R' represents an aliphatic hydrocarbon radical which has 2 to about 8 carbon atoms and which may optionally be substituted with hydroxyalkyl group.

Some of the products which can be prepared according to the invention have already been described in the literature, e.g. in U.S. patent specification No. 2,803,656. They have hitherto been prepared by reacting alkali metal salts of perfluoroalkane sulfonamides with a halohydrin according to the following general reaction equation:

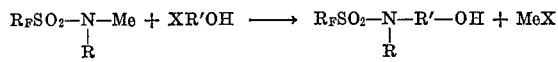

wherein Me is an alkali metal, X is chlorine or bromine, and $R_F$, R and R' have the meanings indicated above.

This method has some serious disadvantages compared with the process according to the invention described below. First, it is a two-stage process since the illustrated starting material must first be prepared from the corresponding sulfonamide by reacting it with an alkali metal alkoxide in alcoholic solution and the illustrated reaction is then carried out with the chloro- or bromo-alkanol after the solvent has been distilled off. Second, the process involves a heterogeneous reaction system so that the reaction times required are long, e.g. of the order of more than 10 hours. Considerable decompositon takes place in the coures of these long reaction times so that complicated purification procedures are necessary and the yields are reduced. An apparently obvious alternative reaction to produce perfluoroalkyl sulfonamidoalkanols, namely the reaction of perfluoroalkyl sulfonylfluoride with e.g. N-alkylethanolamine, cannot be carried out because the OH group as well as the NH group reacts with the sulfonyl halide, and the ester formed by this reaction enters into numerous side reactions owing to its powerful alkylating propensity. Blocking the OH function, e.g. by silylation, does not lead to the desired result because the trimethylsilyl group very rapidly enters into an exchange reaction with sulfonyl fluoride to form trimethylfluorosilane and higher alkylated nitrogen compounds, see Ann. 731, 58 (1970). In accordance with the invention hydroxyalkylperfluoroalkane sulfonamides of the general formula:

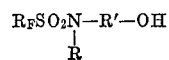

in which $R_F$ represents a straight or branched chain perfluoroalkyl radical having about 1 to 12 carbon atoms;
R represents hydrogen; an alkyl, alkenyl, aralkyl, cycloalkyl or aryl radical which has about 1 to 20 carbon atoms and which may optionally be substituted with inert substituents; or the group R'—OH; and
R' represents an aliphatic hydrocarbon radical which has about 2 to 8 carbon atoms and which may optionally be substituted with hydroxyalkyl groups, are prepared by contacting a perfluoroalkylsulfonamide of the formula:

$$R_F SO_2 NHR$$

with a cyclic carbonate or sulfite at temperatures of about 50° C. to 250° C. in the presence of an inorganic or organic base.

The presence of a solvent is generally not necessary; working up of the product by distillation or crystallization is thereby greatly simplified. The reaction in most cases proceeds very rapidly and its progress can readily be followed by the evolution of $CO_2$ when a carbonate is used. Due to the evolution of $CO_2$, the reaction takes place in a pratically inert gaseous atmosphere so that there is no risk of oxidation of unstable substances such as alkenyl derivatives.

The cyclic carbonates which may be used in the process according to the invention, preferably five membered ring compounds, dioxolones or carbonic acid esters of 1,2-diols having the general formula:

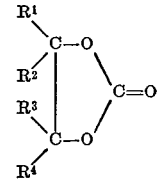

may be prepared e.g. by reacting 1,2-diols with phosgene (Houben-Weyl, vol. VIII, pp. 107 et seq. (1952)).

In the above formula, $R_1$ to $R_4$ represent hydrogen and/or identical or different lower alkyl or alkenyl groups or aryl radicals. The two carbon atoms may also form part of an alicyclic or aromatic ring system. Cyclic carbonates of alkane triols may also be used. The following are mentioned as examples: Ethylene glycol carbonate, propylene glycol carbonate, isomeric butylene and amylene glycol carbonate, glycerol carbonate (1-hydroxy-2,3-propylene carbonate), phenyl - ethyleneglycolcarbonate and 4-methylene-5,5-dimethyl-dioxolan-2-one.

Cyclic sulfites of the formula

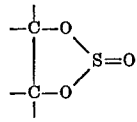

may also be used, in which case $SO_2$ is split off instead of $CO_2$.

In general, however, this affords no advantage over the use of cyclic carbonates, and moreover the sulfur dioxide liberated requires a special absorption apparatus. Bases such as the hydroxides, oxides or carbonates of alkali metals or alkaline earth metals, e.g. KOH, NaOH, $K_2CO_3$, $Mg(OH)_2$ or CaO or organic bases such as pyridine and trialkylamines are used as catalysts for the reaction according to the invention.

The carbonate or sulfite and sulfonamide are preferably used in approximately stoichiometric proportions, e.g. ±20%, although wider variation is permissible. The catalyst may be present to the extent of as little as about 0.1 mole percent or less of the limiting reactant up to 20 percent or even more although it is preferably present in about 1 to 5 mole percent.

It should be noted that even when the cyclic carbonate is used in excess, the reaction of the perfluoroalkane sulfonamides remains at the state of the primary reaction products even after prolonged heating. Moreover, no reaction takes place without the presence of a catalyst even at reflux temperature, e.g. in the case of ethylene glycol carbonate (approximately 240° C.) although aniline, by comparison, is directly converted into 2-anilinoethanol by ethylene carbonate according to Bergmann et al., J. Chem. Soc. C 1966 page 899. Lastly the reaction according to the invention proceeds without the formation of by-products, e.g. the formation of urethanes which contain oxy groups (carbamic acid esters) which is otherwise observed in the reaction with amines (see Houben-Weyl, Methoden der Org. Chemie, vol. 8, pp. 109/139 (1952) or Belgian patent specification No. 625,505).

Particularly valuable products which have hitherto been unknown are obtained by reacting primary perfluoroalkylsulfonamides $R_FSO_2NH_2$ with cyclic carbonates. With ethylene glycol carbonate, for example, both the monosubstituted and the disubstituted alkanol sulfonamides of the formulae:

$$R_FSO_2NHCH_2CH_2OH \text{ and } R_FSO_2N(CH_2CH_2OH)_2$$

are obtained.

As is well known, when sulfonamides are ethoxylated in the normal way (see Houben-Weyl, vol. XIV/2, page 446 (1963)), only one hydrogen atom of the amide group is substituted in most cases because the resulting hydroxyl group reacts more quickly than the second hydrogen atom of the amide group.

The perfluorinated sulfonamides required as starting compounds can easily be prepared by reacting ammonia or primary amines with perfluoroalkylsulfonylfluorides such as $CF_3SO_2F$, $C_4F_9SO_2F$, $C_6F_{13}SO_2F$, or $C_8F_{17}SO_2F$ which in turn can be obtained fairly readily by electrochemical fluorination.

The perfluoroalkylsulfonamides used according to the invention have the general formula:

$$R_FSO_2NHR$$

in which $R_F$ and $R$ have the meaning already described. The sulfonamides preferably used are those in which $R_F$ represents $CF_3$, $C_2F_5$, $C_4F_9$, $C_6F_{13}$ or $C_8F_{17}$ and R represents H, $CH_3$, $C_2H_5$, $C_3H_7$, $C_8H_{37}$, $CH_2CH_3OCH_3$, $CH_2—CH=CH_2$, $C_6H_{11}$ or $CH_2C_6H_5$.

The following are examples of perfluoroalkylsulfonamides which may be used according to the invention:

$CF_3SO_2NH_2$; $C_4F_9SO_2NH_2$; $C_8F_{17}SO_2NH_2$;

$CF_3SO_2NH—CH_3$; $CF_3SO_2NH—C_3H_7$;

$C_4F_9SO_2NH—C_4H_9$; $C_4F_9SO_2NH—CH_2—CH=CH_2$;

$C_4F_9SO_2NH—C_6H_{11}$; $C_4F_9SO_2—NH—CH_2CH_2OCH_3$;

$C_4F_9SO_2—NH—CH_2C_6H_5$; $C_4F_9SO_2NH—C_{12}H_{25}$;

$C_8F_{17}SO_2NH—C_2H_5$; $C_6F_{13}SO_2NH—C_2H_5$ and $C_2F_5SO_2NH—C_{18}H_{37}$.

The products according to the invention are valuable surface active compounds, especially those which have fairly long perfluoroalkyl chains, the so-called fluorinated wetting agents. They may also be used for the production of water repellent and oil repellent impregnating agents for textiles, leather and paper, for the production of soil release or oil release agents, and for the production of polyurethanes, polyesters and polyesters.

The process according to the invention will now be explained more fully with the aid of the following illustrative examples.

EXAMPLE 1

68.2 (0.2 mole) of N-propyl-perfluorobutyl sulfonamide were heated to 200° C. with 19.3 g. (0.22 mole) of ethylene glycol carbonate and 0.5 g. of KOH for about 2 hours. When the evolution of $CO_2$ ceased, the product was fractionally distilled. The main fraction boiled at B.P. $_{0.5\ mm.}$ approx. 105° C., $n_D^{20}=1.3840$, M.P. approx. 30° C. Yield: 72 g. (=93% of theory). According to IR and nuclear resonance spectroscopic investigations, the compound obtained was $C_4F_9SO_2N(C_3H_7)CH_2CH_2OH$.

*Analysis.*—Calculated (percent): C, 28.1; H, 3.15; S, 8.3; N, 3.65; F, 44.4. Found (percent): C, 28.6; H, 3.35; S, 8.7; N, 3.95; F, 44.8. Molecular weight: Calculated 385.2. Found: 399 (osmotically in acetone).

EXAMPLE 2

37.6 g. (0.1 mole) of N-cyclohexyl-perfluorobutylsulfonamide were heated to 150° C. with 11 g. (0.12 mole) of ethylene glycol carbonate and 0.5 g. of KOH for 1½ hours. 35 g. (approximately 82%) of the compound $C_4F_9SO_2N(C_6H_{11})CH_2CH_2OH$ were isolated by fractional vacuum distillation. B.P. $_{0.5\ mm.}$ approximately 140° C.; M.P. approximately 44° C.

The product was identified by IR and $^1H$ and $^{19}F$ nuclear resonance spectra and by analysis.

EXAMPLE 3

20.5 g. (0.1 mole) of N-butyl-trifluoromethylsulfonamide were heated to 130° C. with 8.8 g. (0.1 mole) of ethylene glycol carbonate and 0.2 g. of KOH for about 6 hours. When evolution of $CO_2$ had ceased, the product was worked up by fractional distillation. Yield: 21.5 g. (86.4% of theory). B.P.$_{0.3\ mm.}=79°$ C.; $n_D^{20}=1.4138$.

The IR and NMR spectra agree with the structure $CF_3SO_2N(C_4H_9)CH_2CH_2OH$.

*Analysis.*—Calculated (percent): C, 33,73; H, 5.66; S, 12.86; N, 5.62; F, 22.87. Found (percent): C, 33.6; H, 5.8; S, 13.35; N, 5.75; F, 23.2.

EXAMPLE 4

16.96 g. (0.1 mole) of N-allyl-perfluorobutyl sulfonamide were heated to 110° C. with 4.4 g. (0.1 mole) of ethylene carbonate and 0.2 g. of KOH for about 4 hours. The fractional distillation which was then carried out yielded 13.7 g. (71.5% of theory) of the compound $C_4F_9SO_2N(CH_2—CH=CH_2)CH_2CH_2OH$. The structure of the compound was established by IR and NMR spectra. B.P.$_{0.3\ mm.}$ approximately 84° C.; $n_D^{20}=1.3889$.

*Analysis.*—Calculated (percent): C, 28.21; H, 2.63; S, 8.37; N, 3.66; F, 44.62. Found (percent): C, 28.2; H, 2.8; S, 8.4; N, 3.7; F, 44.3.

EXAMPLE 5

976 g. (3.12 mole) of N-methyl-perfluorobutyl sulfonamide were heated to 200° C. with 302 g. (3.43 mole) of ethylene glycol carbonate and 1 g. of KOH for 4 hours. The evolution of $CO_2$ had ceased by that time. The product was worked up by fractional distillation under vacuum. Yield: 976 g. (87.4% of theory); B.P.$_{0.3\ mm.}$ 88° C. to 91° C.

IR and NMR spectra confirm the structure of the compound: $C_4F_9SO_2N(CH_3)CH_2CH_2OH$; melting point approximately 60° C. to 62° C.

*Analysis.*—Calculated (percent): C, 23.5; H, 2.4; S, 8.95; N, 3.9; F, 48.0. Found (percent): C, 23.65; H, 2.45; S, 9.0; N. 3.9; F, 48.8. Molecular weight: Calculated: 357.5. Found: 373 (osmotically in acetone).

EXAMPLE 6

71 g. (0.1 mole) of N-butyl-perfluorobutyl sulfonamide were reacted with 22.4 g. (0.22 mole) (10% excess) of propylene glycol carbonate and 0.5 g. of KOH at 200° C. for 2 hours. Fractional distillation yielded 69 g. (approximately 83% of the theoretical) of the compound $C_4F_9SO_2N(C_4H_9)CH(CH_3)CH_2OH$, B.P.$_{0.3\ mm.}$ approximately 95° C., $n_D^{20}=1.3890$, identified by IR and nuclear resonance spectra and by analysis. $C_{11}H_{16}NO_3SF_9$ (413.3).

*Analysis.*—Calculated (percent): C, 32.0; H, 3.9; S, 7.75; N, 3.4; F, 41.4. Found (percent): C, 32.3; H, 4.1; S, 8.0; N, 3.75; F, 42.2.

EXAMPLE 7

54.1 g. (0.1 mole) of N-propyl-perfluorooctyl sulfonamide were heated to 200° C. with 10.6 g. (0.12 mole) (20% excess) of ethylene glycol carbonate and 0.5 g. of $K_2CO_3$ for 2 hours. Distillation yielded 46.7 g. (approximately 80% of theory) of the compound $$C_8F_{17}SO_2N(C_3H_7)CH_2CH_2OH$$

B.P.$_{0.5\ mm.}$ approximately 130° C., identified by IR and nuclear resonance spectra and by analysis.

$$C_{13}H_{12}NO_3SF_{17}$$

(585.3).

Calculated (percent): C, 26.7; H, 2.05; S, 5.5; N, 2.4; F, 53.3. Found (percent): C, 27.4; H, 2.4; S, 5.3; N, 2.45; F, 56.1. Molecular weight: 594 (osmotically in acetone).

EXAMPLE 8

0.2 mole of N-methyl-perfluorobutylsulfonamide were reacted in a manner analogous to Example 6 with 0.22 mole of propylene glycol carbonate in the presence of 0.5 g. of KOH at 200° C., and the compound $$C_4F_9SO_2N(CH_3)CH(CH_3)CH_2OH$$

was isolated in a high yield; B.P.$_{0.5\ mm.}$ approximately 85° C., M.P.=54° C. to 57° C.

EXAMPLE 9

60 g. (0.2 mole) of perfluorobutylsulfonamide were heated to 200° C. with 17.6 g. (0.2 mole) of ethylene glycol carbonate and 0.5 g. of KOH for 2 hours. Fractional distillation yielded 52 g. (approximately 76% of theory) of the compound $C_4F_9SO_2NHCH_2CH_2OH$, B.P.$_{1.5\ mm.}$ approximately 125° C.; identified by the spectra and by analysis. $C_6H_6NO_3SF_3$ (343.2).

Calculated (percent): C, 21.0; H, 1.75; S, 9.35; N, 4.1; F, 50.0. Found (percent): C, 21.2; H, 2.1; S, 9.5; N, 4.0; F. 50.2. Molecular weight: 353.

EXAMPLE 10

0.2 mole of perfluorobutyl sulfonamide were reacted as described above with 0.44 mol of ethylene glycol carbonate, and 57 g. (68% of theory) of the compound $C_4F_9SO_2N(CH_2CH_2OH_2)$ B.P.$_{0.3\ mm.}$ approximately 135° C., were isolated. The product was identified my the IR spectrum and by the $^1H$ and $^{19}F$ nuclear resonance spectrum.

*Analysis.*—$C_8H_{10}NO_4SF_9$ (387.2). Calculated (percent): C, 24.8; H, 2.6; S, 8.3; N, 3.6; F, 44.2. Found (percent): C, 25.4; H, 3.0; S, 8.1; N, 3.6; F. 44.9.

EXAMPLE 11

35.7 g. (0.1 mole) of N-(β-methoxyethyl)-perfluorobutyl sulfonamide were reacted with 10.6 g. (0.12 mole) of ethylene glycol carbonate and 0.5 g. of KOH at 200° C. for 4 hours. 27 g. (approximately 68% of theory) of the compound $$C_4F_9SO_2N(CH_2CH_2OCH_3)—CH_2CH_2OH$$

B.P.$_{0.1\ mm.}$ approximately 90° C., were isolated; identified by spectra and analysis.

Propylene glycol carbonate yields analogously the compound $$C_4F_9SO_2N(CH_2CH_2OCH_3)CH(CH_3)CH_2OH$$

B.P.$_{0.2\ mm.}$ approximately 105° C. $n_D^{20}=1.3890$.

EXAMPLE 12

38.9 g. (0.1 mole) of N-benzyl-perfluorobutylsulfonamide were reacted with ethylene glycol carbonate as described above, and the compound $$C_4F_9SO_2N(CH_2C_6H_5)CH_2CH_2OH$$

B.P.$_{0.1\ mm.}$ approximately 120° C., was isolated in approximately 70% yield.

*Analysis.*—Calculated (percent): C, 36.2; H, 2.8; S, 7.4; N, 3.2; F, 39.5. Found (percent): C, 36.7; H, 3.0; S, 7.3; N, 3.1; F, 38.5.

EXAMPLE 13

42.7 g. (0.1 mole) of N-ethyl-perfluorohexyl sulfonamide were reacted with ethylene glycol carbonate in the same way as described above, and the compound $$C_6F_{13}SO_2N(C_2H_5)CH_2CH_2OH$$

B.P.$_{0.2\ mm.}$ approximately 110° C., was isolated in a yield of about 65%.

EXAMPLE 14

20.5 g. (0.1 mole) of N-butyl-trifluoromethyl sulphonamide were heated to 200° C. with 10.6 g. (0.12 mole) of ethylene glycol carbonate and 1 ml. of pyridine as catalyst for ½ hour. Fractional distillation yielded 21 g. (approximately 84% of theory) of the compound $$CF_3SO_3N(C_4H_9)CH_2CH_2OH,$$

B.P.$_{0.2\ mm.}$ approximately 100° C., $n_D^{20}=1.4170$.

EXAMPLE 15

31.3 g. (0.1 mole) of N-methyl-perfluorobutyl sulfonamide were heated to 200° C. with 10.6 g. (0.12 mole) of ethylene glycol carbonate for 2 hours. 1 ml. of triethylamine was used as the catalyst on one occasion and 0.5 g. of NaOH on another. In both cases the compound $C_4F_9SO_2N(CH_3)CH_2CH_2OH$, B.P.$_{0.1\ mm.}$ approximately 85° C., was obtained in 70% yield. The product is the same as in Example 5.

EXAMPLE 16

41.0 g. (0.2 mole) of N-butyl-trifluoromethyl-sulfonamide and 20.4 g. (0.2 mole) of propylene carbonate were heated at 185° C. in the presence of 0.2 g. of KOH for 4 hours. Fractional distillation yielded 36.3 g. (69% of theory) of $CF_3SO_2N(C_4H_9)CH(CH_3)CH_2OH$, B.P.$_{0.3\ mm.}$ 78° C., $n_D^{20}=1.4177$.

*Analysis.*—Calculated (percent): C, 36.5; H, 6.1; S, 12.2; N, 5.3; F, 21.7. Found (percent): C, 36.7; H, 6.2; S, 12.7; N, 5.4; F, 21.7.

EXAMPLE 17

93.5 g. (0.2 mole) of N-dodecyl-perfluorobutyl-sulfonamide and 26.4 g. (0.3 mole) of ethylene carbonate were heated to a temperature of not more than 185° C. in the presence of 1 ml. of triethylamine for 8 hours. Vigorous evolution of $CO_2$ occurred at about 120° C. 79 g. (77% of theory) of $C_4F_9SO_2N(C_{12}H_{25})CH_2CH_2OH$ could be isolated by fractional distillation at B.P.$_{0.2\ mm.}$ 175° C. 180° C. $n_D^{20}=1.4153$. Decomposition took place when the temperature was raised above the limit indicated.

*Analysis.*—Calculated (percent): C, 42.3; H, 5.9; S, 6.3; N, 2.7; F, 33.4. Found (percent): C, 43.5; H, 6.1; S, 6.3; N, 3.1; F, 21.8.

The IR, $^1H$ and $^{19}F$ spectra are in agreement with the structure.

EXAMPLE 18

263.5 g. (0.5 mole) of N-ethyl-perfluorooctyl-sulfonamide and 48.4 g. (0.5 mole) of ethylene carbonate were heated to a temperature of not more than 175° C. in the presence of 1 ml. of pyridine. Vigorous evolution of $CO_2$ was observed at 140° C. The reaction was completed after 6 hours. Fractional distillation yielded 262 g. (92% of theory) of $C_8F_{17}SO_2N(C_2H_5)CH_2CH_2OH$, at $B.P._{0.2\ mm.}$ 150° C.

*Analysis.*—Calculated (percent): C, 25.2; H, 1.8; S, 5.6; N, 2.4; F, 56.5. Found (percent): C, 25.4, H, 1.8; S, 5.6; N, 2.4; F, 64.7.

The structure was confirmed by the IR, $^1H$ and $^{19}F$ spectra.

EXAMPLE 19

163.5 g. (0.5 mole) of N-ethyl-perfluorobutyl sulfonamide and 54.0 g. (0.5 mole) of ethylene sulfite were heated to a temperature of not more than 200° C. in the presence of a catalytic amount of KOH for about 24 hours. Vigorous evolution of $SO_2$ was observed at 160° C. Fractional distillation yielded 152 g. (82% of theory) of $C_4F_9SO_2N(CH_2CH_2OH$ at $B.P._{0.7\ mm.}$ 100° C. to 105° C.; $n_D^{20} = 1.3790$.

*Analysis.*—Calculated (percent): C, 25.9; H, 2.7; S, 8.6; N, 3.8; F, 46.1. Found (percent): C, 26.0; H, 2.5; S, 8.6; N, 3.5; F, 45.4.

The structure was confirmed by the IR, $^1H$ and $^{19}F$ spectra.

EXAMPLE 20

74.5 g. (0.5 mole) of trifluoromethylsulfonamide and 59.0 g. (0.5 mole) of glycerol carbonate were heated to temperatures of up to 200° C. in the presence of a KOH pellet for about 10 hours. Vigorous evolution of $CO_2$ started at about 150° C.

Distillation yielded at $B.P._{1.4\ mm.}$ 150° C. a yellow brown, wax-like product the main component of which constituted the expected compound $$CF_3SO_2NHCH_2CH(OH)CH_2OH.$$

The structure was confirmed by the IR, $^1H$ and $^{19}F$ spectra.

It will be appreciated that the instant specification and examples are set forth by way of illustration and not limitation and that various modifications and changes may be made without departing from the spirit and scope of the present invention.

What is claimed is:
1. Process for the preparation of hydroxyalkyl-perfluroalkalane sulfonamides of the general formula

$$R_FSO_2N-R'-OH$$
$$|$$
$$R$$

in which $R_F$ is a straight or branched chain perfluoroalkyl radical having 1 to about 12 carbon atoms, R is hydrogen, an alkyl, alkenyl, aralkyl, cycloalkyl or aryl radical which has 1 to about 20 carbon atoms, optionally substituted with inert substituents, or R'—OH, and R' is an aliphatic hydrocarbon radical having 2 to about 8 carbon atoms optionally substituted with a hydroxyalkyl radical, comprising contacting a perfluoroalkylsulfonamide of the formula $$R_FSO_2NHR$$

with a cyclic carbonate or sulfite at a temperature of about 50° C. to 250° C. in the presence of an inorganic or organic base.

2. Process according to claim 1, wherein the cyclic carbonate used is the carbonic acid ester of a 1,2-diol.

3. Process according to claim 1, wherein the cyclic carbonate is that of an alkane triol.

References Cited

UNITED STATES PATENTS 2,803,656    8/1957    Ahlbrecht et al. _____ 260—556
2,915,554    12/1959    Ahlbrecht et al. _____ 260—556

HENRY R. JILES, Primary Examiner

G. T. TODD, Assistant Examiner

U.S. Cl. X.L.

252—355; 260—327 H, 340.2